United States Patent
Breuel et al.

(10) Patent No.: US 10,606,933 B2
(45) Date of Patent: Mar. 31, 2020

(54) METHOD AND SYSTEM FOR DOCUMENT IMAGE LAYOUT DECONSTRUCTION AND REDISPLAY

(75) Inventors: Thomas M. Breuel, Brisbane, CA (US); Henry S. Baird, San Carlos, CA (US); William C. Janssen, Mt. View, CA (US); Ashok C. Popat, San Carlos, CA (US); Daniel S. Bloomberg, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 1523 days.

(21) Appl. No.: 13/152,984

(22) Filed: Jun. 3, 2011

(65) Prior Publication Data
US 2011/0289395 A1 Nov. 24, 2011

Related U.S. Application Data

(63) Continuation of application No. 10/064,892, filed on Aug. 27, 2002, now abandoned.
(Continued)

(51) Int. Cl.
*G06F 17/00* (2019.01)
*G06F 17/22* (2006.01)
(Continued)

(52) U.S. Cl.
CPC ........ *G06F 17/2264* (2013.01); *G06F 17/211* (2013.01); *G06F 17/2229* (2013.01); *G06F 17/24* (2013.01); *G06K 9/00463* (2013.01)

(58) Field of Classification Search
CPC ........ G06K 9/00442; G06K 9/48; G06K 9/46; G06K 9/00463; G06F 3/14; G06F 17/24;
(Continued)

(56) References Cited

U.S. PATENT DOCUMENTS 4,251,799 A * 2/1981 Jih ................. G06K 9/3283
382/174
5,159,667 A * 10/1992 Borrey et al. ............. 715/205
(Continued)

FOREIGN PATENT DOCUMENTS

WO WO 01/71651 A1 9/2001

OTHER PUBLICATIONS

An OCR-Independent Character Segmentation Using Shortest-Path in Grayscale Document Images, Jia Tse, Sixth International Conference on Machine Learning and Applications, DOI 110.1109/ICMLA 2007.21 File Name: npl_non_ocr.pdf.*
(Continued)

*Primary Examiner* — Cesar B Paula
*Assistant Examiner* — David Faber
(74) *Attorney, Agent, or Firm* — Fay Sharpe LLP

(57) ABSTRACT

The invention converts a document originating in a page-image format into a form suitable for an arbitrarily sized display, by reformatting or "re-flowing" of the document to fit an arbitrarily sized display device. A two-stage system analyzes, or "deconstructs," page image layout. The deconstruction includes both physical (geometric) and logical (functional) segmentation of page images. The segment that image elements may include blocks, lines, and/or words of text, and other segmented image elements. The segment that image elements are synthesized and converted into an intermediate structure. The intermediate data structure is then distilled or converted or redisplayed into any number of standard print formats.

24 Claims, 4 Drawing Sheets

Related U.S. Application Data

(60) Provisional application No. 60/360,171, filed on Mar. 1, 2002.

(51) Int. Cl.
*G06F 17/24* (2006.01)
*G06F 17/21* (2006.01)
*G06K 9/00* (2006.01)

(58) Field of Classification Search
CPC . G06F 17/211; G06F 17/2264; G06F 17/2229
USPC ......... 382/173, 181; 395/148, 934; 715/205, 715/249, 251, 238
See application file for complete search history.

(56) References Cited

U.S. PATENT DOCUMENTS

| | | | | |
|---|---|---|---|---|
| 5,321,770 | A * | 6/1994 | Huttenlocher | G06K 9/00463 382/174 |
| 5,390,354 | A * | 2/1995 | de Heus | G06F 17/217 715/200 |
| 5,548,700 | A | 8/1996 | Bagley et al. | |
| 5,555,362 | A * | 9/1996 | Yamashita | G06K 9/00463 382/173 |
| 5,574,802 | A * | 11/1996 | Ozaki | G06K 9/00463 358/462 |
| 5,583,949 | A * | 12/1996 | Smith | G06K 9/481 382/199 |
| 5,724,985 | A * | 3/1998 | Snell | A61N 1/08 600/510 |
| 5,734,761 | A * | 3/1998 | Bagley | G06T 11/60 382/309 |
| 5,745,600 | A * | 4/1998 | Chen | G06K 9/72 382/218 |
| 5,784,487 | A | 7/1998 | Cooperman | |
| 5,825,919 | A | 10/1998 | Bloomberg et al. | |
| 5,832,530 | A | 11/1998 | Paknad et al. | |
| 5,848,184 | A | 12/1998 | Taylor et al. | |
| 5,850,627 | A * | 12/1998 | Gould | G09B 19/04 704/231 |
| 5,893,127 | A * | 4/1999 | Tyan et al. | 715/209 |
| 5,911,146 | A * | 6/1999 | Johari | G06F 17/217 715/234 |
| 6,023,714 | A | 2/2000 | Hill et al. | |
| 6,208,426 | B1 | 3/2001 | Saito et al. | |
| 6,300,947 | B1 | 10/2001 | Kanevsky | |
| 6,336,124 | B1 * | 1/2002 | Alam | G06F 17/2229 715/205 |
| 6,633,314 | B1 | 10/2003 | Tuli | |
| 6,895,552 | B1 * | 5/2005 | Balabanovic | G06F 17/30247 707/999.007 |
| 7,028,258 | B1 * | 4/2006 | Thacker et al. | 715/209 |
| 7,203,903 | B1 * | 4/2007 | Thompson | G06F 3/04883 382/187 |
| 8,352,855 | B2 * | 1/2013 | Levy et al. | 715/243 |
| 2001/0018697 | A1 * | 8/2001 | Kunitake | G06F 17/211 715/234 |
| 2002/0029232 | A1 | 3/2002 | Bobrow et al. | |
| 2002/0046245 | A1 | 4/2002 | Hillar et al. | |
| 2002/0056085 | A1 | 5/2002 | Fahraeus | |
| 2002/0143821 | A1 | 10/2002 | Jakubowski | |
| 2003/0014445 | A1 | 1/2003 | Formanek et al. | |
| 2003/0121006 | A1 * | 6/2003 | Tabata | G06F 17/2229 715/205 |
| 2004/0205568 | A1 * | 10/2004 | Breuel | G06F 17/211 715/205 |
| 2004/0205616 | A1 * | 10/2004 | Rosenberg | G06F 17/2264 715/205 |
| 2010/0174983 | A1 * | 7/2010 | Levy et al. | 715/243 |
| 2011/0289395 | A1 * | 11/2011 | Breuel | G06F 17/211 715/205 |

OTHER PUBLICATIONS

Document Image Summarization Without OCR, Dan Bloomberg and Francine R. Chen, 1996 Proceedings of International Conference on Image Processing vol. 1, pp. 229-232. File Name: IEEE_non_OCR.pdf.*

Bloomberg et al. "Document Image Summarization without OCR", IEEE Conference page ISBN: 0-7803-3259-8, published 1996 (Year: 1996).*

TextBridge Pro 96, Website Product Specification, Archive.org, 1997.

Sakaguchi et ai, "A Browsing Tool for Multilingual Documents for Users without Multilingual Fonts", ACM, 1996.

"Welcome to the First WWW Server in Bulgarian with DeleGate and CIILIB", http://baka.aubg.bg, Archive.org, Feb. 1997.

Microsoft Paint XP, "Save As," screendumps, Microsoft Windows XP Professional.

Okun et al., "Page Segmentation and Zone Classification: The State of the Art", University of Maryland, Nov. 1999.

Ishitani, "Document image analysis with cooperative interaction between layout analysis and logical structure analysis,"Toshiba Corporation.

Chen et al., "Summarization of Imaged Documents without OCR", Xerox Palo Alto Research Center.

Breuel, "Robust Least Square Baseline Finding using a Branch and Bound Algorithm", Xerox PARC.

Breuel et al., "Paper to PDA", Xerox Palo Alto Research Center.

Bergler et al., "Logical Block Labeling for Diverse Types of Document Images", Concordia University.

Joint Bi-level Image Experts Group & Joint Photographic Experts Group, "Coding of Still Pictures", JBIG Committee, Jul. 1999.

Breuel, "Layout Analysis by Exploring the Space of Segmentation Parameters", Xerox Palo Alto Research Center.

* cited by examiner

METHOD AND SYSTEM FOR DOCUMENT IMAGE LAYOUT DECONSTRUCTION AND REDISPLAY

This is a Continuation of application Ser. No. 10/064,892 filed Aug. 27, 2002. This application claims the benefits of U.S. Provisional Application No. 60/360,171, filed on Mar. 1, 2002. The disclosure of the prior applications are hereby incorporated by reference herein in their entirety.

BACKGROUND OF THE INVENTION

1. Field of Invention

The invention relates generally to the problem of making an arbitrary document, conveniently readable on an arbitrarily sized display.

2. Description of Related Art

Existing systems for rendering page-image versions of documents on display screens have required manual activities to improve the rendering, or clumsy panning mechanisms to view direct display of page images on wrong-sized surfaces. In particular, it has been necessary to either (1) key in the entire text manually, or (2) process the page images through an optical character recognition (OCR) system and then manually tag the resulting text in order to preserve visually important layout features.

Problems with existing systems include: (a) high expense of manual keying and/or correcting of OCR results and manual tagging; (b) the risk of highly visible and disturbing errors in the text resulting from OCR mistakes; and (c) the loss of meaningful or aesthetically pleasing typeface and type size choices, graphics and other non-text elements; and (d) loss of proper placement of elements on the page.

Such problems are significant, for example, because book publishers are increasingly creating page-image versions of books currently being published, as well as books from their backlists. The page-image versions are being created for print-on-demand usage. While print-on-demand images can be re-targeted to slightly larger or slightly smaller formats by scaling the images, they cannot currently be re-used for most electronic book purposes without either re-keying the book into XML format, or scanning the page images using OCR and manually correcting the re-keyed and scanned images.

SUMMARY OF THE INVENTION

The invention provides methods and systems for converting any document originating in a page-image format, such as a scanned hardcopy document represented as a bitmap, into a form suitable for display on screens of arbitrary size, through automatic reformatting or "reflowing" of document contents.

Reflowing is a process that moves text elements (often words) from one text-line to another so that each line of text can be contained within given margins. Reflowing typically breaks or fills lines of text with words, and may re-justify column margins, so that the full width of a display is used and no manual 'panning' across the text is needed. As an example, as a display area, within which lines of text appear, is altered so that the width of the visible text is reduced, it may be necessary for words to be moved from one text-line to another to shorten the length of all of the text-lines so that no text-line is too long to be entirely visible in the display area. Conversely, if the display area is widened, words may be moved from one text-line to another so that the length of text-lines increase, thereby allowing more text-lines to be seen without any word image being obscured.

Image and layout analysis transforms the raw document image into a form that is reflowable and that can be more compactly represented on hand-held devices. In various exemplary embodiments, image analysis begins with adaptive thresholding and binarization. For each pixel, the maximum and minimum values within a region around that pixel, are determined using greyscale morphology. If the difference between these two values is smaller than a statistically determined threshold, the region is judged to contain only white pixels. If the difference is above the threshold, the region contains both black and white pixels, and the minimum and maximum values represent the blank ink and white paper background values, respectively. In the first case, the pixel value is normalized by bringing the estimated white level to the actual white level of the display. In the second case, the pixel value is normalized by expanding the range between the estimated white and black levels to the full range between the white level and the black level of the display. After this normalization process, a standard thresholding method can be applied.

In the thresholded image, connected components are labeled using a scan algorithm combined with an efficient union-find data structure. Then, a bounding box is determined for each connected component. This results in a collection of usually several thousand connected components per page. Each connected component may represent a single character, a portion of a character, a collection of touching characters, background noise, or parts of a line drawing or image. These bounding boxes for connected components are the basis of the subsequent layout analysis.

In various exemplary embodiments, for layout analysis, the bounding boxes corresponding to characters in the running text of the document, as well as in a few other page elements, such as, for example, headers, footers, and/or section headings, are used to provide important information about the layout of the page needed for reflowing. In particular, the bounding boxes and their spatial arrangement identify page rotation and skew, column boundaries, what tokens may be needed for token-based compression, reading order, and/or how the text should flow between different parts of the layout. Bounding boxes that are not found to represent "text" in this filtering operation are not lost, however. Such bounding boxes can later be incorporated into the output from the system as graphical elements.

The dimensions of bounding boxes representing body text are found using a simple statistical procedure. Using the distribution of heights as a statistical mixture of various components, for most pages containing text, the largest mixture component often corresponds to lower case letters at the predominant font size. The size is used to find the x-height of the predominant font and the dimension is used to filter out bounding boxes that are either too small or too large to represent body text or standard headings.

Given a collection of bounding boxes representing text, it is desirable to find text lines and column boundaries. The approach used in various exemplary embodiments to identify text lines and column boundaries relies on a branch-and-bound algorithm that finds maximum likelihood matches against line models under a robust least square error model, i.e., a Gaussian noise model in the presence of spurious background features. Text line models are described by three parameters: the angle and the offset of the line, and the descender height. Bounding boxes whose alignment point, that is, the center of the bottom side of the bounding box, rests either on the line or at a distance given by the descender height below the line, are considered to match the line. Matches are penalized by the square of their distance from the model, up to a threshold value ϵ, which is usually on the order of five pixels.

After a text line has been found, the bounding box that bounds all of the connected components that participated in the match is determined. All other connected components that fall within that bounding box are assigned to the same text line. This tends to "sweep up" punctuation marks, accents, and "i"-dots that would otherwise be missed. Within each text line, multiple bounding boxes whose projections onto the baseline overlap are merged. This results in bounding boxes that predominantly contain only or more complete characters, as opposed to bounding boxes that contain only or predominantly portions of characters. The resulting bounding boxes are then ordered by the x-coordinate of the lower left corner of the bounding boxes to obtain a sequence of character images in reading order. Multiple text lines are found using a greedy strategy, in which the top match is first identified. Then, the bounding boxes that participated in the match are removed from further consideration. Next, the next best text line is found, until no good text line matches can be identified anymore.

This approach to text line modeling has several advantages over known projection or linking methods. First, different text lines can have different orientations. Second, by taking into account both the baseline and the descender line, the technique can find text lines that are missed by known text line finders. Third, the matches returned by this method follow the individual text lines more accurately than other known methods.

Column boundaries are identified in a similar manner by finding globally optimal maximum likelihood matches of the center of the left side of bounding boxes against a line model. In order to reduce background noise, prior to applying the line finder to column finding, statistics about the distribution of horizontal distances between bounding boxes are used to estimate the intercharacter and inter-words spacing, i.e., the two largest components in the statistical distribution of horizontal bounding box distances. The bounding boxes for characters are then merged into words. This reduces severalfold the number of bounding boxes that need to be considered for column matching and tends to improve the reliability of column boundary detection.

Any connected components that are not part of a text line are grouped together and treated as images. For a single column document, by enumerating text lines and bounding boxes of images in order of their y-coordinates, a sequence of characters, whitespaces, and images in reading order is obtained. For a double column document, the two columns are treated as if the right column were placed under the left column.

This simple layout analysis technique copes with a large number of commonly occurring layouts in printed documents and transform such layouts into a sequence of images that can be reflowed and displayed on a smaller-area display device. The simple technique works well in these applications because the requirements of reflowing for a smaller-area display device, such as a document reader, are less stringent than for other layout analysis tasks, like rendering into a word processor. Since the output of the layout analysis will only be used for reflowing and not for editing, no semantic labels need to be attached to text blocks. Because the documents are reflowed on a smaller area screen, there is also no user expectation that a rendering of the output of the layout analysis precisely match the layout of the input document. Furthermore, if page elements, like headers, footers, and/or page numbers, are incorporated into the output of the layout analysis, users can easily skip such page elements during reading. Such page elements may also serve as convenient navigational signposts on the smaller-area display device.

In various exemplary embodiments, the methods and systems according to this invention more specifically provide a two-stage system which analyzes, or "deconstructs", page image layouts. Such deconstruction includes both physical, e.g., geometric, and logical, e.g., functional, segmentation of page images. The segmented image elements may include blocks, lines, and/or words of text, and other segmented image elements. The segmented image elements are then synthesized and converted into an intermediate data structure, including images of words in correct reading order and links to non-textual image elements. The intermediate data structure may, for example, be expressed in a variety of formats such as, for example, Open E-book XML, Adobe™ PDF 1.4 or later, HTML and/or XHTML, as well as other useful formats that are now available or may be developed in the future. In various exemplary embodiments, the methods and systems according to this invention then distill or convert, the intermediate data structure for "redisplay" into any of a number of standard electronic book formats, Internet browsable formats, and/or print formats.

In various exemplary embodiments of the methods and systems according to this invention, the intermediate data structure may contain tags, such as those used in SGML and XML, which state the logical functions or geometric properties of the particular image elements the tags annotate. It is also possible that, in various exemplary embodiments, some image elements may not have tags attached to them. For example, in instances where the functions and properties of image elements may be inferable from their position and the position of other tagged and untagged image elements in the intermediate data structure, such tags may not be necessary.

It is also possible that, in various exemplary embodiments, special image elements that can be used for this purpose are not extracted from the original page image, but are created as tagged or untagged elements. Such special image elements can be inserted into the intermediate data structure in an order that would define the desired functions and properties of other image elements. For example, a special image element may be a blank that represents a space between two words. Further, special non-image markers, other than tags attached to particular image elements, could be inserted so that the functions and properties of at least some of the image elements may be inferred from their relative position with respect to the markers within the intermediate data structure.

To prepare the intermediate data structure for redisplay, the intermediate data structure may be converted, for example, to HTML for use on a standard Internet browser, or to Open E-book XML format for use on an Open E-book reader. Other methods may include, for example, converting the intermediate data structure to Plucker format for use on a Plucker electronic book viewer, or to Microsoft Reader format for display using MS Reader format or to a print format for printing to paper or the like.

In any document image, the physical layout geometry is fixed and the logical or functional layout structure is implicit. That is, it is intended to be understood by human readers, who bring, to the task of reading, certain conventional expectations of the meaning and implications of layout, typeface, and type size choices. In various exemplary embodiments, in the intermediate data structure according to the methods and systems of this invention, by contrast, the original fixed positions of words are noted but not strictly adhered to, so that the physical layout becomes fluid. In various exemplary embodiments, aspects of the logical structure of the document are captured explicitly, and automatically, and represented by additional information. In various exemplary embodiments, the intermediate data structure according to this invention is automatically adaptable at the time of display to the constraints of size, resolution, contrast, color, geometry, and/or the like, of any given display device or circumstance of viewing.

The adaptability enabled by the methods and systems according to this invention include re-pagination of text, reflowing, such as, for example, re-justification, reformatting, and/or the like, of text into text-lines, and logical linking of text to associated text and/or non-text contents, such as illustrations, figures, footnotes, signatures, and/or the like. In various exemplary embodiments, the methods and systems according to this invention take into account typographical conventions used to indicate the logical elements of a document, such as titles, author lists, body text, paragraphs, and/or hyphenation, for example. In various exemplary embodiments, the methods and systems of the invention also allow the reading order to be inferred within blocks of text and/or among blocks of text on the page.

Thus, redisplaying the document is enabled for a wide range of displays whose size, resolution, contrast, available colors, and/or geometries may require the document's contents to be reformatted, reflowed, re-colored, and/or reorganized to achieve a high degree of legibility and a complete understanding of the document's contents, without requiring OCR or re-keying, and without being subject to the respective attendant errors of OCR or re-keying, and without losing the look and feel of the original document as chosen by the author and publisher.

In various exemplary embodiments, the methods and systems according to this invention reduce costs by obviating the need for manual keying, correction of OCR results, and/or tagging. In various exemplary embodiments, the methods and systems according to this invention tend to avoid introducing OCR character recognition errors. In various exemplary embodiments, the methods and systems according to this invention tend to preserve typeface and type size choices made by the original author and publisher, which may be helpful, or even essential, in assisting the reader in understanding the author's intent. In various exemplary embodiments, the methods and systems according to this invention also tend to preserve the association of graphics and non-textual elements with related text.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods according to this invention will be described in detail, with reference to the following figures, wherein.

DETAILED DESCRIPTION OF EXEMPLARY EMBODIMENTS

Figure 1:
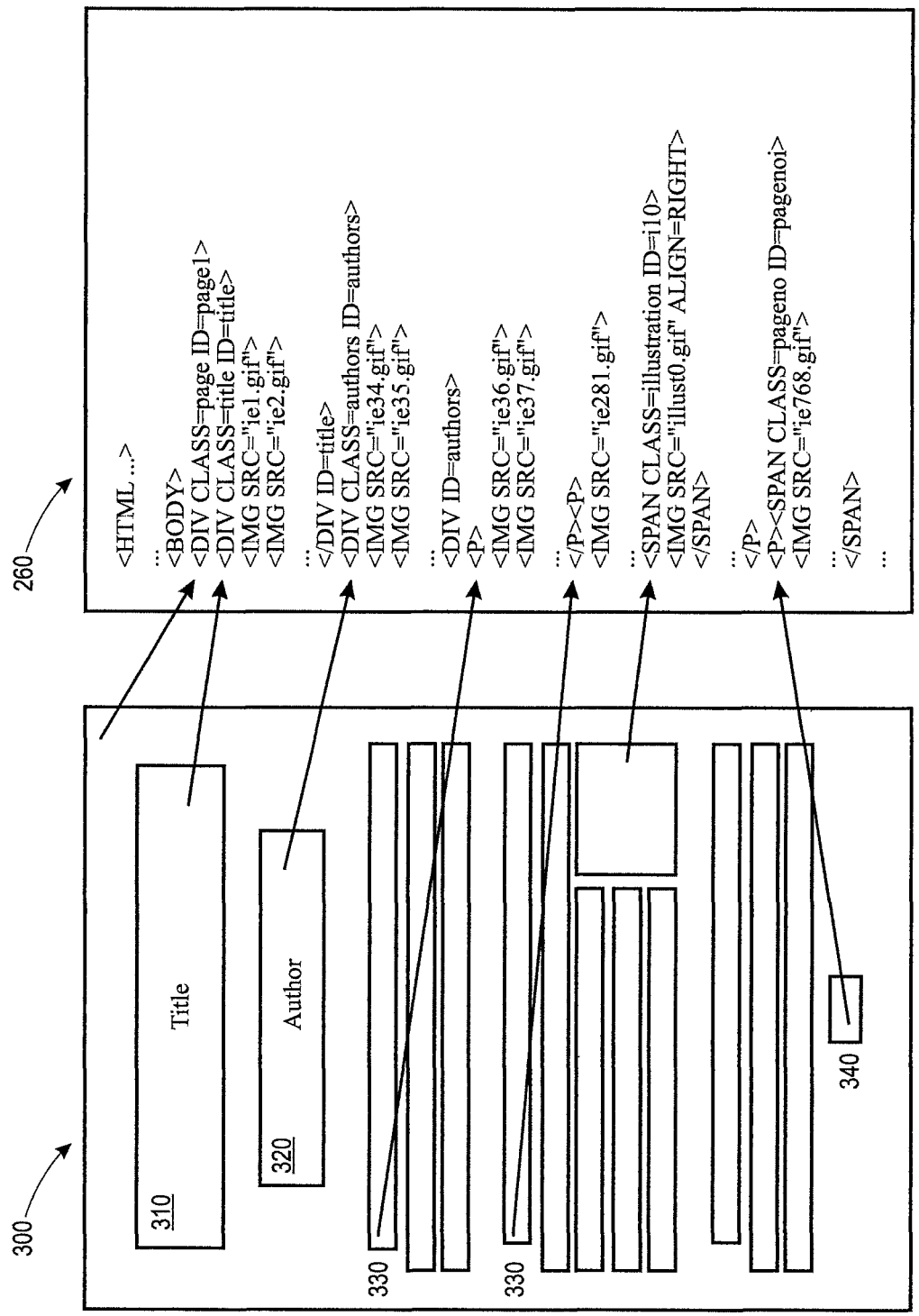
FIG. 1 illustrates an intermediate representation of an image of a page, using XHTML.

FIG. 1 illustrates a detailed example of an intermediate data structure 260 for a page image 300. In FIG. 1 the intermediate data structure 260 is expressed using XHTML as an example of an intermediate data structure format. The page image 300 is shown schematically having a first text area 310 which functions as a title, a second area 320 which functions as an author list, third text areas 330 which function as paragraphs, and a fourth text area 340 which functions as a page number. The structures represented by these text areas 310-340 are usually significant to both the author and the reader, and so are detected and preserved in the intermediate data structure 260. For example, the intermediate data structure 260 preserves the title text area 310 by noting the position of this title text area 310 at the top of the page image, that the text area 310 is centered, and the large typeface used in this text area 310. The position is preserved in the intermediate data structure 260 by the XHTML tag "<DIV CLASS=title ID=title>". Also, the intermediate data structure 260 preserves the author-list text area 320 by the position, of this author-list text area 320 just beneath the title text area 310. The intermediate data structure 260 preserves the centered position of the author-list text area 320, and that the author-list text area 320 is printed in a large typeface that is smaller than the typeface of the title text area 310. In particular, in the specific exemplary embodiment shown in FIG. 3, the author-list text area 320 is preserved in the intermediate data structure 260 by the XHTML tag "<DIV CLASS=authors ID=authors>".

Figure 2:
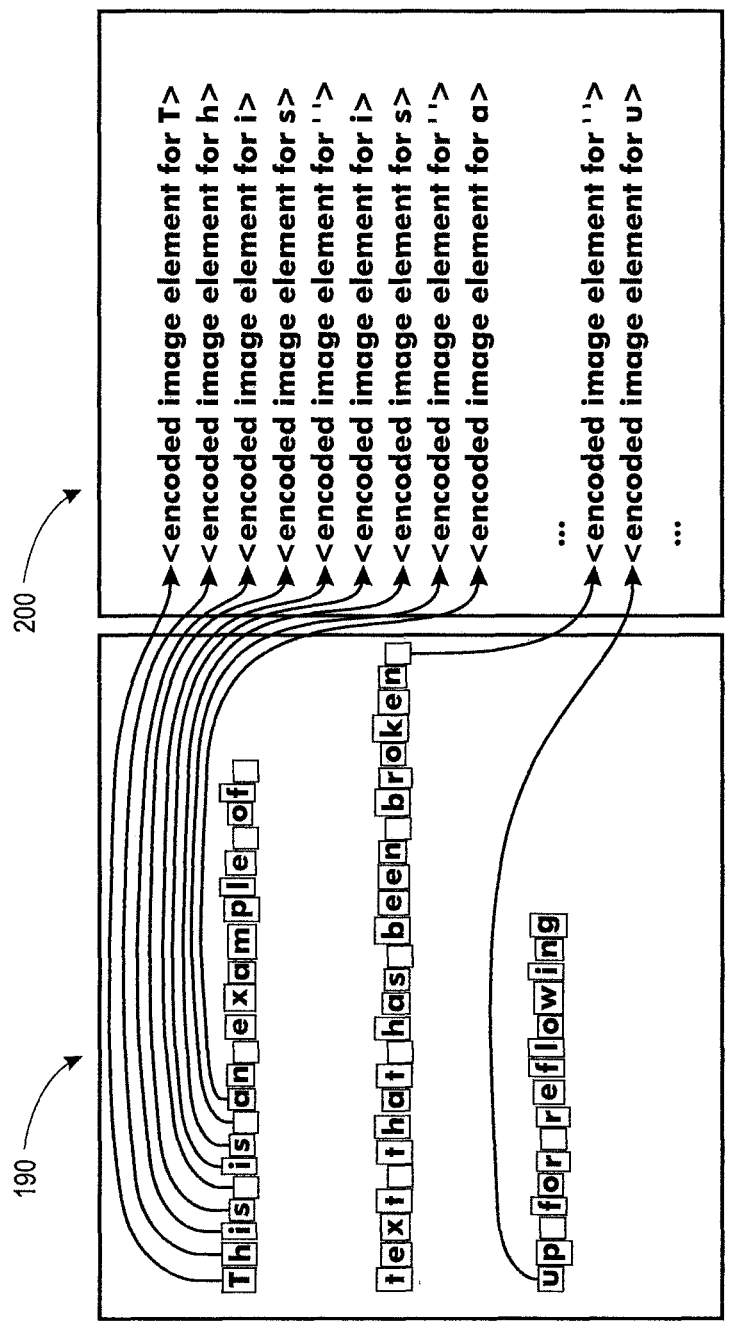
FIG. 2 illustrates the format and content of the intermediate representation without the use of tags or explicit separators.

FIG. 2 shows a representation of the page image 300 as a sequence of image elements 190, and the corresponding representative compressed image tokens 200, without using attached tags or explicit separators. For example, in a document where the functions and properties of image elements may be inferable from their position on the page and the position of other tagged and untagged image elements in the intermediate data structure, it is not necessary to tag all of the image elements.

Figure 3:
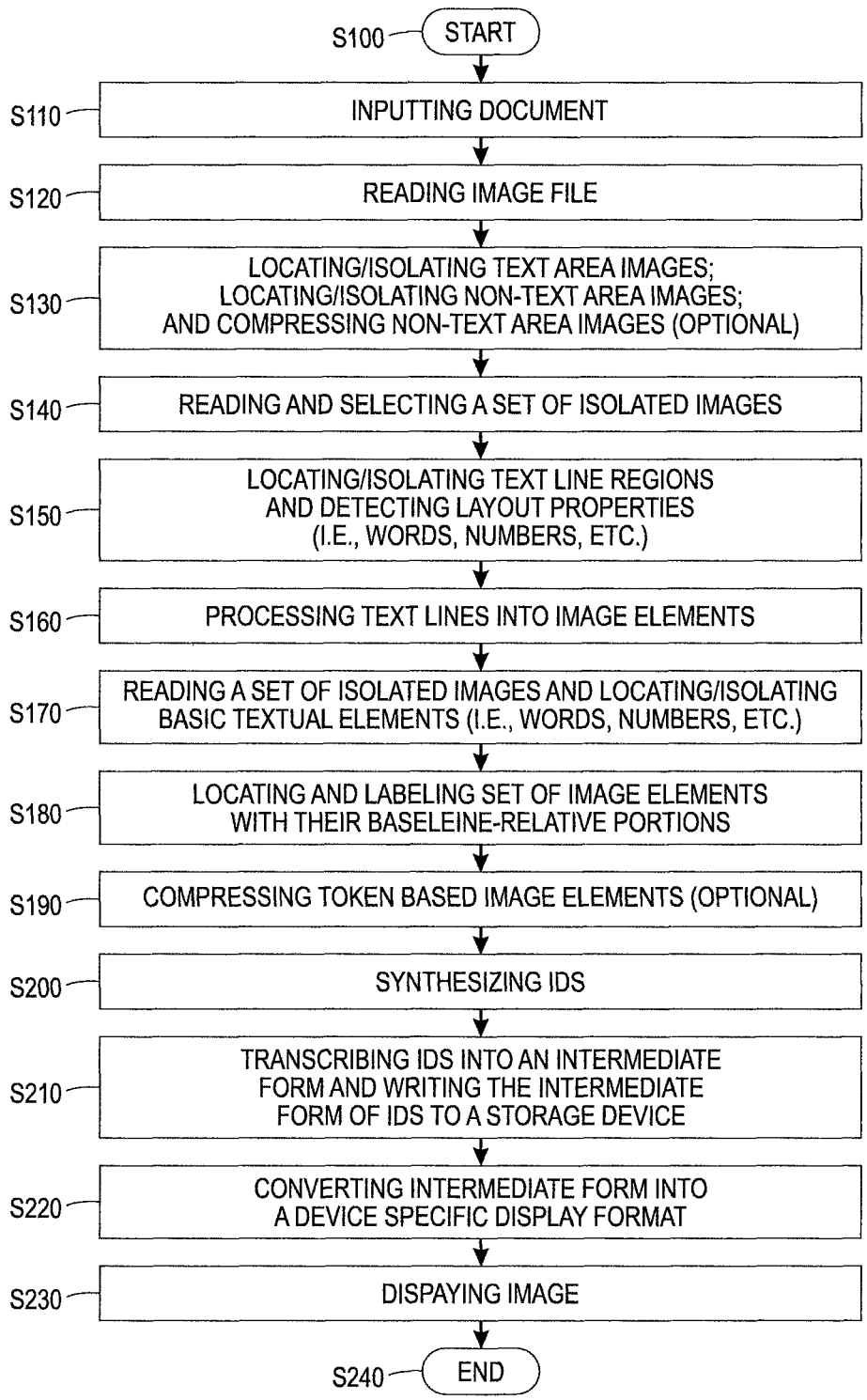
FIG. 3 is a flowchart outlining one exemplary embodiment of a method for document image layout deconstruction and redisplay.

FIG. 3 is a flowchart outlining one exemplary embodiment of a method for document image layout deconstruction and redisplay. As shown in FIG. 3, operation of the method begins in step S100 and continues to step S110, where a document is input by scanning, or use of another data source that provides a document that is in a page image format. The document may be represented as a set of page images, such as bi-level, gray-scale, or as color images, in one of a set of image file formats such as TIFF and JPEG, for example.

Then, in step S120, the image file of the page image is analyzed to identify text image areas and non-text image areas. Text area images may include, for example, blocks (or columns), lines, words, or characters of text. Non-text area images may include, for example, illustrations, figures, graphics, line-art, photographs, handwriting, footnotes, signatures and/or the like.

Next, in step S130, the identified text image areas and non-text image areas are located and isolated. Locating and isolating text image areas may include, for example, locating and isolating the baseline and, possibly, top-line and/or cap-line, of each text line image. The isolated line regions are modeled as line segments that run from one end of the text line image to another. Baselines may be modeled as straight lines which are horizontal or, in the case of Japanese, Chinese, and other scripts, vertical, or oriented at some angle near the horizontal or the vertical. Baselines may also be modeled as curved functions. Operation then continues in step S140.

In step S140, the isolated text image areas are selected for further processing. Next, in step S150, the text line regions of the selected text image areas are located and isolated and the layout properties of the selected text image areas are then determined. Layout properties may include, for example, indentation, left and/or right justification, centering, hyphenation, special spacing (e.g. for tabular data), proximity to figures and other non-textual areas, and the like. Layout properties may also include type size and typeface-family properties (e.g. roman/bold/italic styles) that may indicate the function of the text within the page. Operation then continues in step S160.

In step S160, the located text line regions are further processed into a set of segmented image elements. Then in step S170, the segmented image elements are read and basic textual elements are located and isolated. Basic textual elements may include, for example, words, numbers, dates, proper names, bibliographic references, references to figures, and/or other non-textual elements within or outside the document. The textual elements will become the basic image units which will be reflowed and reconstructed in later stages. As part of locating the segmented image elements, each segmented image element is labeled with the position of the element relative to the baseline of the text line so that when the text-lines are later reflowed, the reconstructed baseline may be referred to when placing the corresponding segmented image elements so the elements appear to share the newly constructed baseline. Operation then continues to step S180.

In step S180, the set of segmented image elements are labeled with their baseline-relative position. Next, in step S190, the segmented image elements and the relative baselines portions are compressed into token-based image elements. Then, in step S200, the image elements are synthesized into an intermediate data structure. Operation then continues to step S210.

In step S210, the intermediate data structure is stored to retain the data in an intermediate format until distilling and redisplay is desired. Then, in step S220, the stored data is distilled to convert the data into a device specific display format. The intermediate data structure may be converted, for example, to HTML for use on a standard Internet browser, or to Open E-book XML format for use on an Open E-book reader. Other methods may include, for example, converting the intermediate data structure to Plucker format for use on a Plucker electronic book viewer, or to Microsoft Reader format for display using MS Reader format or to a print format for printing to paper or the like. Next, in step S230, the distilled data is displayed to the user. Operation of the method then continues to step S240, where operation of the method ends.

In various exemplary embodiments of this invention, the intermediate data structure may also be in a form that can be processed by an E-Book distiller for redisplaying the intermediate data structure on an E-book reader. In the event the intended use is to display an electronic book, then an E-book distiller reads the intermediate data structure and prepares it for display on a specific device such as a PDA, a computer graphical interface window, or any other graphical display device. Such processing of the intermediate data structure is not limited to an E-Book distiller, but may accomplished be any method or device for re-converting the intermediate data structure for redisplay on a selected display device.

In various exemplary embodiments of this invention, the intermediate data structure may be expressed in a variety of formats such as, for example, Open E-book XML, Adobe™ PDF 1.4 or later, HTML and/or XHTML, as well as other useful formats that are now available or may be developed in the future. In various exemplary embodiments of this invention, the intermediate data structure may contain tags, such as those used in SGML and XML.

In various exemplary embodiments, in step S190, the segmented image elements are compressed into a smaller number of prototype images, so that each incoming element may be replaced by a prototype that is visually similar to, or perhaps indistinguishable from the image elements. This is an instance of 'token-based' compression where the tokens are the image elements. Therefore, if the image elements are words, then the tokens are words. Alternatively, it may be advantageous to cut the image elements into smaller images corresponding exactly or approximately with individual characters since there are fewer distinct characters than words in some languages. Compressing the segmented image elements may further include writing a set, or dictionary, of representative compressed image tokens, and a list of references into the representative compressed image tokens. Each reference represents an original image element labeled with its position relative to the baseline.

In various exemplary embodiments of this invention, the non-text image areas, compressed non-text image areas, the set of representative compressed image tokens, the segmented image elements and/or the layout characteristics are synthesized in step S200 into an intermediate data structure. However, in various exemplary embodiments of this invention, non-text area images may optionally first be compressed in step S190, for file compression, before being synthesized in step S200 for integration into the intermediate data structure. Additionally, in various exemplary embodiments of this invention, the segmented image elements may be optionally compressed in step S190 before being synthesized in step S200 for integration into the intermediate data structure. Determining whether to compress the non-text image areas and the segmented image elements may be dependent on file size or other user specific parameters. If the intermediate data structure does not include compressed data, then the intermediate data structure may be represented as XHTML, for example.

In various exemplary embodiments of this invention, the intermediate data structure may also contain a tagged list containing references to every textual and non-textual image element that are proximate to or references by textual image element as well as layout characteristics such as indentation, hyphenation, spacing, and the like. In addition to this list, a set of representative compressed image tokens can be written to a separate but intimately associated image element database. The intermediate data structure contains all the information required to support the reflowing and the reconstruction of the image elements.

Figure 4:
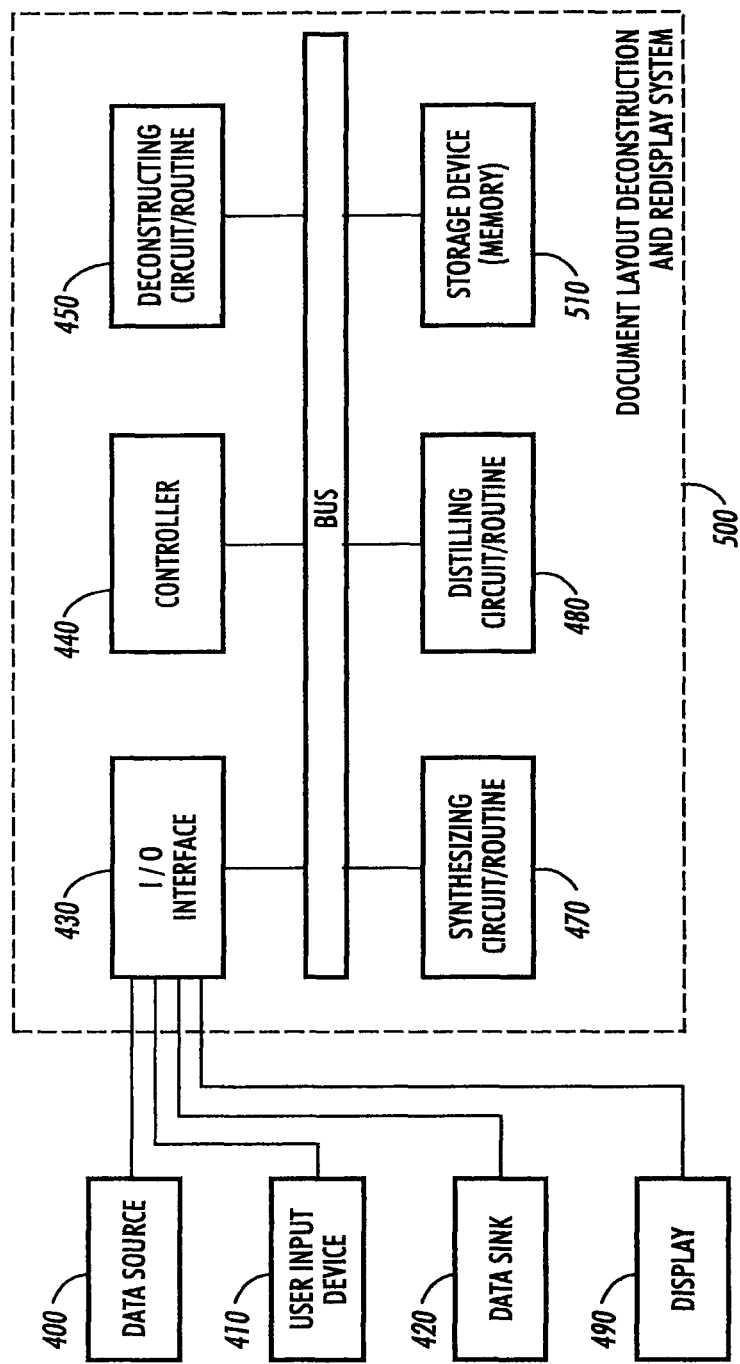
FIG. 4 is a block diagram of one exemplary embodiment of a document deconstruction and display system according to this invention.

FIG. 4 is a block diagram of one exemplary embodiment of a document deconstruction and redisplay system 500 according to this invention. As shown in FIG. 4, one or more user input devices 410 are connected over one or more links to an input/output interface 430. Additionally, a data source 400 is connected over a link 502 to the input/output interface 430. A data sink 420 is also connected to the input/output interface 430 through a link.

Each of the links (e.g., from any of data source 400, user input device 410, or data sink 420 to input/output interface 430) can be implemented using any known or later developed device or system for connecting the one or more user input devices 410, the data source 400 and the data sink 420, respectively, to the document layout deconstruction and redisplay system 500, including a direct cable connection, a connection over a wide area network or a local area network, a connection over an intranet, a connection over the Internet, or a connection over any other distributed processing network or system. In general, each of the links (e.g., from any of data source 400, user input device 410, or data sink 420 to input/output interface 430) can be any known or later developed connection system or structure usable to connect the one or more user input devices 410, the data source 400 and the data sink 420, respectively, to the document layout deconstruction and redisplay system 500.

The input/output interface 430 inputs data from the data source 400 and/or the one or more user input devices 410 and outputs data to the data sink 420, as shown in FIG. 4. The input/output interface 430 also provides the received data to one or more of the controller 440, the memory 510, a deconstructing circuit, routine or application 450, a synthesizing circuit, routine or application 470, a distilling circuit, routine or application 480, and/or a display 490. The input/output interface 430 receives data from one or more of the controller 440, the memory 510, the deconstructing circuit, routine or application 450, the synthesizing circuit, routine or application 470, and/or the distilling circuit, routine or application 480.

The memory 510 stores data received from the deconstructing circuit, routine or application 450, synthesizing circuit, routine or application 470, the distilling circuit, routine or application 480, and/or the input/output interface 430. For example, the original data, the deconstructed data, the synthesized data, and/or the distilled data, may be stored in the memory 510. The memory can also store one or more control routines used by the controller 440 to operate the document layout deconstruction and redisplay system 500.

The memory 510 can be implemented using any appropriate combination of alterable, volatile or non-volatile memory or non-alterable, or fixed, memory. The alterable memory, whether volatile or non-volatile, can be implemented using anyone or more of static or dynamic RAM, a floppy disk and disk drive, a writable or re-writeable optical disk and disk drive, a hard drive, flash memory or the like. Similarly, the non-alterable or fixed memory can be implemented using anyone or more of ROM, PROM, EPROM, EEPROM, an optical ROM disk, such as a CD-ROM or DVD-ROM disk, and disk drive or the like.

It should be understood that each of the circuits or routines shown in FIG. 4 can be implemented as portions of a suitably programmed general purpose computer. Alternatively, each of the circuits or routines shown in FIG. 4 can be implemented as physically distinct hardware circuits within an ASIC, or using a FPGA, a PDL, a PLA or a PAL, or using discrete logic elements or discrete circuit elements. The particular form each of the circuits or routines shown in FIG. 4 will take is a design choice and will be obvious and predicable to those skilled in the art.

In operation, the data source 400 outputs a set of original data, i.e., input document, scanned document, or the like, over a link to the input/output interface 430. Similarly, the user input device 410 can be used to input one or more of a set of newly created original data, scanned data, or the like, over a link to the input/output interface 430. The input/output interface 430 directs the received set of data to the memory 510 under the control of the controller 440. However, it should be appreciated that either or both of these sets of data could have been previously input into the document layout deconstruction and redisplay system 500.

An input document is input into the deconstructing circuit, routine or application 450 under control of the controller 440. The deconstructing circuit, routine or application 450 reads image files and locates and isolates text area images and non-text area images. Non-text area images are then sent to the synthesizing circuit, routine or application 470 under control of the controller 440 for synthesizing the data into an intermediate data structure. Non-text images may optionally be compressed prior to being synthesized at the synthesizing circuit, routine or application 470.

The deconstructing circuit, routine or application 450 reads the set of isolated images text area images and locates and isolates text line regions and detects the layout properties of the text line regions. The layout properties are sent to the synthesizing circuit, routine or application 470 under the control of the controller 440. The text line regions are further processed by the deconstructing circuit, routine or application 450 into a set of segmented image elements with their baseline relative portions and then sent to the synthesizing circuit or routine 470 under control of the controller 440 for synthesizing into an intermediate data structure. The deconstructing circuit, routine or application 450 may also compress the segmented image elements with their baseline relative portions into token-based image elements before being sent to the synthesizing circuit, routine or application 470 under control of the controller 440 for synthesizing into an intermediate data structure.

It should be appreciated that the deconstructing circuit, routine or application 450 and the synthesizing circuit, routine or application 470 can use any known or later-developed encoding scheme, to deconstruct and synthesize the data to be converted into an intermediate data structure that may then be distilled by the distilling circuit, routine or application 480 for display on the display device 490.

The synthesizing circuit, routine or application 470 synthesizes the non-text area images and compressed non-text area image elements, the set of representative compressed image tokens, the segmented image elements and the layout characteristics, and transcribes the data into an intermediate data structure. The intermediate data structure is sent to the memory 510 under the control of the controller 440 for storage.

Upon request by a user of the input document, the distilling circuit, routine or application 480 converts the intermediate data structure into a format usable by the display 490. The distilling circuit, routine or application 480, under control of the controller 440 and the input output interface 430, will output the converted intermediate data structure to the user's device for display.

It should be appreciated that the distilling circuit, routine or application 480 can use any known or later-developed encoding scheme, including, but not limited to, those disclosed in this application, to convert the intermediate data structure into a device specific format usable for redisplay on an arbitrarily sized display.

In various exemplary embodiments, the systems and methods of this invention also relate to the use of special non-image markers, other than tags attached to particular image elements, to infer the functions and properties of all the image elements from their relative positions with respect to the markers within the intermediate data structure.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made to the invention without departing from the spirit and scope thereof.

What is claimed is:

1. A method of converting a document in a page-image format into a form suitable for an arbitrarily sized display, comprising:
    deconstructing a document in a page image format into a set of segmented image elements which include lines of text, the lines of text found by:
        finding bounding boxes corresponding to characters of text;
        identifying a best match for a first text line; and
        identifying a next best text line by removing bounding boxes that participated in the best match for the first text line;
    prior to identifying column boundaries, using statistics about a distribution of horizontal distances between bounding boxes to estimate intercharacter and interwords spacing;
    identifying the column boundaries by finding globally optimal maximum likelihood matches of a center of a left side of bounding boxes against a line model;
    synthesizing the deconstructed document into an intermediate data structure that is convertible into a commercially available format using a process other than optical character recognition; and
    distilling the intermediate data structure for redisplay by converting the intermediate data structure into a format usable for reflow on an arbitrarily sized display,
    wherein the intermediate data structure is automatically adaptable at the time of display to constraints of a corresponding display device or circumstance of viewing, and the text of each individual page is formatted for layout and rendered for human readable redisplay, and
    wherein distilling the intermediate data structure for redisplay in a format usable for reflow on an arbitrarily sized display for each individual page, includes redisplaying the document in human readable format.

2. The method of claim 1, wherein deconstructing the document in a page image into the set of segmented image elements includes at least one of physical segmentation of data and logical segmentation of data.

3. The method of claim 1, wherein the set of segmented image elements comprises at least one of blocks, words, groups of characters, and groups of non-text characters.

4. The method of claim 1, wherein synthesizing includes converting non-text image areas, layout properties and segmented image areas into the intermediate data structure.

5. The method of claim 1, wherein synthesizing the set of segmented image elements into an intermediate data structure includes integrating at least one of bitmapped images in an intelligible display layout and links to non-textual elements.

6. The method of claim 1, wherein for layout analysis boundary boxes corresponding to characters in running text of the document are used to provide information about the layout of the page needed for the reflowing of the text.

7. The method of claim 1, wherein distilling the intermediate data structure for redisplay in a format usable for reflow on an arbitrarily sized display for each individual page includes redisplaying the document in at least one of an electronic book format, Internet browsable format and a print format.

8. The method of claim 1, wherein distilling the intermediate data structure includes converting the stored intermediate data structure into a device specific display format for display.

9. The method of claim 1, wherein the intermediate data structure is adaptable to at least one of display screen size, page size, resolution, contrast, color and geometry, at the time of display.

10. The method of claim 1 further including:
    obtaining a collection of bounding boxes corresponding to connected components of the text; and
    finding text lines using the collection of bounding boxes by application of a branch and bound algorithm that finds maximum likelihood matches against text line models, wherein after a text line is found, the bounding box that bounds all the connected components that participated in the match is determined and all other connected components within that bounding box are assigned to the same text line, and wherein the bounding boxes and their spatial arrangement identify a rotation and skew, column boundaries, and tokens for token-based compression, reading order and/or how the text flows between different parts of the layout.

11. The method of claim 1, wherein the intermediate data structure includes special image elements that are not extracted from the document, but are created as tagged or untagged elements, such special image elements are inserted into the intermediate data structure in an order that defines the desired functions and properties of other image elements, wherein a particular special image element includes a blank that represents a space between two words, and wherein special non-image markers, are inserted into the intermediate data structure so that functions and properties of at least some of the image elements are inferred from their relative position with respect to the markers within the intermediate data structure.

12. A system of converting a document in a page-image format into a form suitable for an arbitrarily sized display, comprising:
    an input/output device;
    a controller;
    a deconstructing device that deconstructs a document;
    a synthesizing device that synthesizes the deconstructed document into an intermediate data structure that is convertible into a commercially available format using a process other than optical character recognition;
    a distilling device that distills the intermediate data structure for redisplay by converting the intermediate data structure into a format usable for reflow on an arbitrarily sized display, the intermediate data structure being automatically adaptable at the time of display to constraints of the arbitrarily sized display; and
    a non-transitory memory, wherein:
    the deconstructing device first deconstructs the document in a page image format into non-text image areas, layout properties, and a set of compressed segmented image elements which include lines of text, and a column boundary, the lines of text found by:
        finding bounding boxes corresponding to characters of text;
        identifying a best match for a first text line; and
        identifying a next best text line by removing bounding boxes that participated in the best match for the first text line;

the column boundary found by:
: prior to identifying the column boundary, using statistics about a distribution of horizontal distances between bounding boxes to estimate intercharacter and inter-words spacing; and
: identifying the column boundary by finding globally optimal maximum likelihood matches of a center of a left side of bounding boxes against a line model;

the synthesizing device then synthesizes the non-text image areas, the layout properties, and the set of segmented image elements into the intermediate data structure using a process other than optical character recognition; and the distilling device then distills the intermediate data structure for redisplay in the format usable for reflow on an arbitrarily sized display, the text of each individual page being formatted for layout and rendered for display, wherein distilling the intermediate data structure for redisplay in a format usable for reflow on an arbitrarily sized display for each individual page, includes redisplaying the document in human readable format.

13. The system of claim 12, wherein the deconstructing device deconstructs the document in a page image format into the set of segmented image elements that includes at least one of physical segmentation of data and logical segmentation of data.

14. The system of claim 12, wherein the intermediate data structure includes at least one of bitmapped images in an intelligible display layout and links to non-textual elements.

15. The system of claim 12, wherein the distilling device distills the intermediate data structure for redisplay of the document in a format usable for reflow on an arbitrarily sized display for each individual page includes redisplaying the document in at least one of an electronic book format, Internet browsable format, and a print format, wherein for layout analysis bounding boxes corresponding to characters in running text of the document are used to provide information about the layout of the page needed for the reflowing of the text.

16. The system of claim 12, wherein the distilling device converts the stored intermediate data structure into a device specific display format for display.

17. The system of claim 12, wherein the intermediate data structure is adaptable to at least one of display screen size, paper size, resolution, contrast, color and geometry, at the time of display.

18. The system of claim 12, wherein the deconstructing device analyzes page layout and converts a sequence of page images into a sequence of document element images captured in a tagged format while maintaining pagination; and
: the distilling device converts the tagged format into at least one of an electronic book format, an Internet browsable format that can accept images and a print format.

19. The system of claim 18, wherein the tagged format preserves at least one of reading order and logical page layout properties for each individual page of the document.

20. The system of claim 12, wherein the deconstructing device includes a segmentation algorithm and a background structure analyzer.

21. A method for document image layout deconstruction and redisplay comprising:
: inputting a document to provide the document in a page image format, wherein the document is represented as page images, including being represented as at least one of bi-level images, gray-scale images, and color images;
: finding lines of text by:
:: finding bounding boxes corresponding to characters of text;
:: identifying a best match for a first text line; and
:: identifying a next best text line by removing bounding boxes that participated in the best match for the first text line;
: finding a column boundary by:
:: first, using statistics about a distribution of horizontal distances between bounding boxes to estimate intercharacter and inter-words spacing; and
:: second, identifying the column boundary by finding globally optimal maximum likelihood matches of a center of a left side of bounding boxes against a line model;
: analyzing an image file in the page image format to identify text image areas and non-text image areas, wherein text image areas include at least one of blocks, columns, the lines of text, words, and the characters of text, and wherein non-text area images include at least one of illustrations, figures, graphics, line-art, photographs, handwriting, footnotes, and signatures;
: locating and isolating the identified text image areas and non-text image areas, wherein locating and isolating of the text image areas include at least one of locating and isolating a baseline and a top-line of each text line image, wherein the isolated line regions are modeled as line segments that run from one end of the text line image to another;
: selecting the isolated text image areas for further processing, wherein text line regions of the selected text image areas are located and isolated and layout properties of the selected text image areas are determined, wherein the layout properties include at least one of indentation, left and/or right justification, centering, hyphenation, and proximity to figures, and wherein layout properties include at least one of type size and typeface-family properties that indicate a function of the text within the page images;
: further processing the located text line regions into a set of segmented image elements;
: reading the segmented image elements and basic textual elements of the segmented image elements;
: locating and isolating the basic textual elements which include at least one of words, numbers, dates, proper names, bibliographic references, and references to figures, wherein the basic textual elements become basic image units which are configured to be reflowed and reconstructed, wherein each segmented image element is labeled with a position relative to the baseline of the text lines, wherein when the text lines are reflowed, a reconstructed baseline is referred to when placing corresponding segmented image elements so the segmented image elements appear to share a newly constructed baseline;
: labeling the set of segmented image elements with a baseline relative position;
: synthesizing the segmented image elements into an intermediate data structure;
: storing in memory the intermediate data structure to retain data in an intermediate format, wherein the intermediate data structure contains all information required to support the reflowing and reconstruction of the image elements of a page to be redisplayed;

distilling data of the stored intermediate data structure to convert the data of the intermediate data structure into a device specific display format, wherein the stored intermediate data structure is automatically adaptable to constraints of a particular device specific display format at the time of display; and redisplaying the distilled data in human readable format.

22. The method according to claim 21 wherein at least one of the non-text image areas, compressed non-text image areas, the set of representative compressed image tokens, the segmented image elements and the layout characteristics are synthesized into the intermediate data structure.

23. The method according to claim 21 wherein the intermediate data structure contains a tagged list containing references to every textual and non-textual image element that are proximate to or references by textual image element as well as layout characteristics including at least one of indentation, hyphenation.

24. The method of claim 21, wherein the intermediate data structure includes special image elements that are not extracted from the document, but are created as tagged or untagged elements, such special image elements are inserted into the intermediate data structure in an order that defines the desired functions and properties of other image elements, wherein a special image element includes a blank that represents a space between two words, and wherein special non-image markers, are inserted into the intermediate data structure so that functions and properties of at least some of the image elements are inferred from their relative position with respect to the markers within the intermediate data structure.

\* \* \* \* \*